United States Patent [19]
Church

[11] Patent Number: 5,198,185
[45] Date of Patent: Mar. 30, 1993

[54] NUCLEAR REACTOR FLOW CONTROL METHOD AND APPARATUS

[76] Inventor: John P. Church, 1204 Woodbine Rd., Aiken, S.C. 29803

[21] Appl. No.: 689,425

[22] Filed: Apr. 23, 1991

[51] Int. Cl.⁵ .............................................. G21C 15/00
[52] U.S. Cl. .................................. 376/399; 376/409; 376/210
[58] Field of Search ............... 376/399, 395, 210, 361, 376/400, 409, 439, 443, 444

[56] References Cited

U.S. PATENT DOCUMENTS

| | | | |
|---|---|---|---|
| 3,215,606 | 11/1965 | Silvester | 376/399 |
| 3,623,948 | 11/1971 | Dotson et al. | 176/50 |
| 3,823,066 | 7/1974 | Thome | 376/400 |
| 3,861,999 | 1/1975 | Zmola et al. | 176/61 |
| 4,158,605 | 6/1979 | Cooper, Jr. et al. | 376/399 |
| 4,788,032 | 11/1988 | Baujat et al. | 376/399 |
| 4,793,966 | 12/1988 | Veronesi | 376/377 |
| 4,834,937 | 5/1989 | Aspden | 376/377 |
| 4,947,485 | 8/1990 | Oosterkamp | 376/210 |

Primary Examiner—Donald P. Walsh
Assistant Examiner—Frederick H. Voss
Attorney, Agent, or Firm—Harold M. Dixon; William R. Moser; Richard E. Constant

[57] ABSTRACT

Method and apparatus for improving coolant flow in a nuclear reactor during accident as well as nominal conditions. The reactor has a plurality of fuel elements in sleeves and a plenum above the fuel and through which the sleeves penetrate. Holes are provided in the sleeve so that coolant from the plenum can enter the sleeve and cool the fuel. The number and size of the holes are varied from sleeve to sleeve with the number and size of holes being greater for sleeves toward the center of the core and less for sleeves toward the periphery of the core. Preferably the holes are all the same diameter and arranged in rows and columns, the rows starting from the bottom of every sleeve and fewer rows in peripheral sleeves and more rows in the central sleeves.

10 Claims, 3 Drawing Sheets

NUCLEAR REACTOR FLOW CONTROL METHOD AND APPARATUS

BACKGROUND OF THE INVENTION

Field of the Invention

The present invention relates to coolant flow in nuclear reactors. In particular, the present invention relates to controlling the flow of coolant through reactor fuel during normal and emergency conditions. The United States Government has rights in this invention pursuant to Contract No. DE-AC09-89SR18035 between the U.S. Department of Energy and Westinghouse Savannah River Company.

Discussion of Background

In a nuclear reactor, coolant, usually water, is used to remove heat from the fissioning fuel. Depending upon the reactor design, water may also serve to increase the rate of fission by moderating the speed of neutrons so that they are more likely to cause fission in the nuclei of fuel material.

In the event of an abnormal occurrence during reactor operations or a reactor accident, the control system of the reactor can be activated to shut down the fission process. Although the rate of fission can be reduced very quickly, the fuel continues to generate considerable heat as a result of the radioactive decay of the fission products that resulted from nuclear fission of fuel material prior to shutdown.

A particularly severe type of accident is a loss-of-coolant accident, wherein the flow of coolant to the reactor core is abruptly reduced. Although the core is shut down by activating the control system, the decay heat can be sufficient to cause melting of the fuel material. Good reactor design anticipates this accident scenario and seeks to minimize the effects of decay heat following a LOCA.

In normal power operation the distribution of heat produced by the reactor core, that is, the collection and arrangement of nuclear fuel elements, is not uniform. Fuel elements toward the center of the core tend to produce more power than those toward the periphery of the core. If the distribution of power varies too much, several reactor performance-related problems can occur. Therefore, in many reactors, design features are incorporated to reduce power variation across the core and, indeed, to "shape" the power distribution. To permit an increase in total reactor power, the coolant distribution should be shaped to correspond to the power distribution.

In certain reactors, coolant flows into a plenum above the core and then down into the core through various orifices. Briefly, and referring to FIG. 1 which illustrates an example of this type of reactor, the coolant flows from the plenum through slots in a first sleeve surrounding each fuel element position, then through an array of holes in a universal sleeve housing into the region directly above the fuel element. An orifice plate is positioned in the sleeve housing, below the holes, to reduce the flow to the element. Each position in the core may have a different orifice plate. The different plates have different numbers and arrangements of holes so that the flow in each position may vary. Reducing the flow in the outer positions and increasing the flow to the more centrally-located elements improves flow distribution generally to the higher powered fuel elements.

Unfortunately, this design, although working well during normal operation, does not provide optimum flow distribution during the very low flow conditions that occur in the event of a LOCA and result in an unnecessarily restrictive operating power limit.

Various other designs exist to improve reactor flow. In U.S. Pat. No. 4,947,485, Oosterkamp discloses a design for better flow during "load follow" (the adjusting or reactor power level to accommodate changes in electrical demand during the day). His improved flow results from better mixing and by establishing flow between the downcomer region and the chimney. Veronesi provides holes of different sizes and patterns in an upper-core, plenum shroud, as described in U.S. Pat. No. 4,793,966. The use of vanes is described by Dotson, et al. in U.S. Pat. No. 3,623,948 to improve flow distribution at the entrance of the fuel region.

Zmola, et al., use a variety of structural elements to force more flow to the hotter, higher power density regions of the core from the cooler, lower-power density regions, as described in U.S. Pat. No. 3,623,999. In particular, Zmola, et al. use entrance reduction elements and holes in the sides of tubular members to achieve the improved flow.

There remains, however, a need for improved flow of coolant in reactors under both nominal and accident conditions.

SUMMARY OF THE INVENTION

According to its major aspects and broadly stated, the present invention is a coolant flow distribution that results in improved flow during accident conditions without degrading flow during nominal conditions. The modification comprises imposing a variation in the number and size of holes in the sleeve housings from one sleeve to another to increase amount of coolant flowing to the fuel in the center of the core and decrease, relatively, flow to the peripheral fuel. Preferably, the holes are arranged in rows and columns from the bottom of the upper portion of the sleeves to the top, where the plenum ends, with all holes having the same diameter and some sleeves having more rows than others to create the different flows. Those sleeves with the greatest number of rows are placed in the center of the core; those with the least are placed in the core periphery.

An important feature of the present invention is the use of the variations in the number and possibly the size of holes in the sides of the sleeve to change the flow distribution in the core to a more favorable one. This feature eliminates the orifice plate and improves distribution of coolant flow during both accident and nominal conditions. Moreover, considerable flexibility is available to a designer in varying the number of holes and size of holes to meet a particular power shape across the core.

Another feature of the present invention is the variation of the number of rows of holes by eliminating rows of holes from the top of the upper portion of the sleeve. Preferably the core is divided into zones that correspond roughly to rings. Beginning with the next-to-central ring, one row of holes is eliminated with each ring until the peripheral ring is reached. Eliminating a few rows of holes in the outer rings substantially increases flow during LOCA without impacting the flow during nominal conditions.

Other features and advantages of the present invention will be apparent to those skilled in the art from a careful reading of the Detailed Description of a Preferred Embodiment presented below and accompanied by the drawings.

DETAILED DESCRIPTION OF A PREFERRED EMBODIMENT

Figure 1:
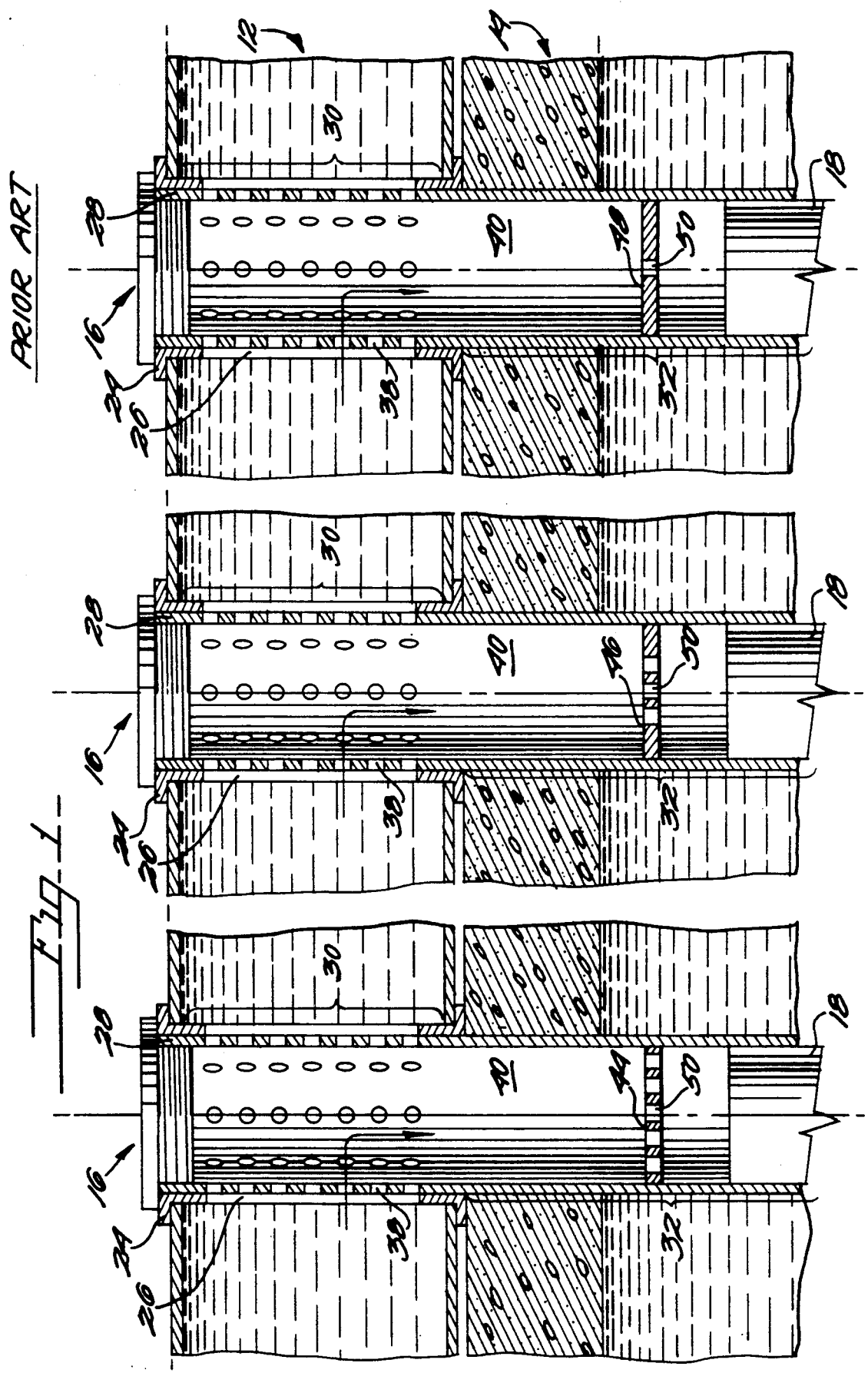
FIG. 1 illustrates a side, partially cut-away view of a portion of a prior art reactor showing in particular three sleeves at the top where the sleeves penetrate into the plenum.

FIG. 1 shows a portion of an existing type of reactor 10. The portion shown is interior to a reactor vessel, namely, a portion of a reactor 10 having a plenum 12 and a shield 14. Coolant, as indicated by the arrows, flows into plenum and circulates among a plurality of penetrations 16. There is one penetration 16 for each fuel element 18. Only three penetrations 16 are shown although a greater number exists, perhaps 600. The left side of FIG. 1 represents a typical penetration 16 near the center of the reactor core; the right side, the reactor periphery; the center, an intermediate penetration 16. The purpose of penetrations 16 is to provide a path for coolant to flow down through shield 14 and into each element 18 to remove the heat of fission and radioactive decay.

Penetration 16 comprises a slotted tube 24 having a plurality of vertical slots 26, a universal sleeve housing 28 within slotted tube 24 that extends from just above plenum 12 downward, surrounding fuel element 18. Universal sleeve housing 28 has an upper portion 30 and a lower portion 32 defined essentially by plenum 12 so that lower portion 32 is generally below plenum 12 and upper portion 30 is even with plenum 12. Universal sleeve housing 28 has a plurality of holes 38 in upper portion 30 arranged in rows and columns to allow the passage of coolant from plenum 12 through slots 26 and thence into interior 40 of sleeve 28. In lower portion 32 are orifice plates 44, 46, 48 which have holes 50.

Orifice plates 44, 46, 48 are to restrict flow to fuel elements 18. Plates 44, 46, 48 will restrict more for peripheral positions than core interior positions, as suggested by the relative number of holes 50 in FIG. 1, which number is illustrative only. The number of holes 50 in orifice plates 44, 46, 48 varies from sleeve to sleeve. Slots 26 are lined up with holes 38 by a conventional keying arrangement between slotted tube 24 and housing 28. Toward the center of the core, orifice plates will have more holes than toward the periphery; for example, orifice plate 44 will have more holes 50 than orifice plate 46, which is at an intermediate position, and orifice plate 48, near the periphery of the core, will have the fewest holes 50. The number of holes 50 determines the amount of restriction in the flow of coolant to fuel elements 18. The fewer the number of holes 50, the lower the flow of coolant through orifice plates, 44, 46, 48.

Figure 2:
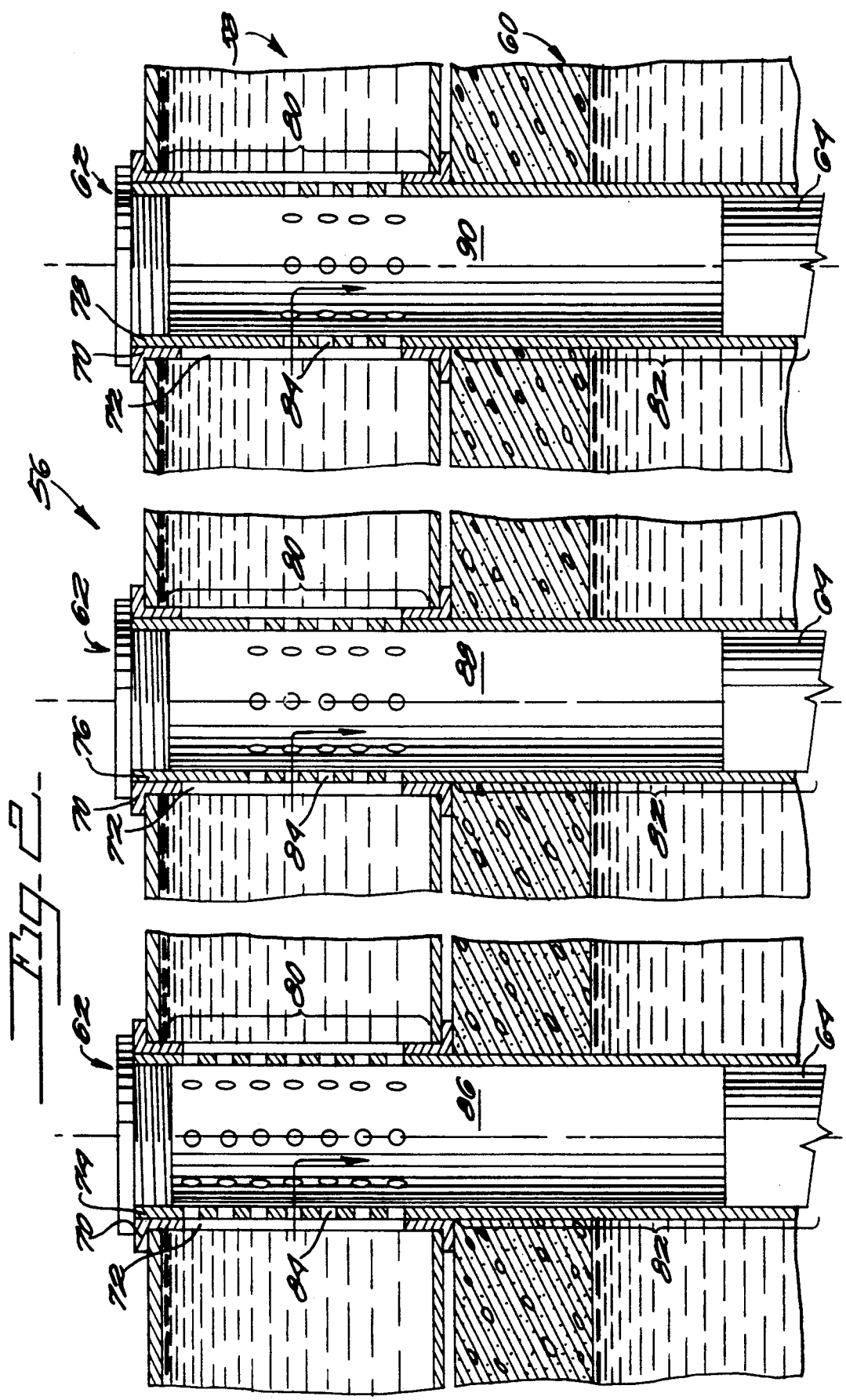
FIG. 2 is a side, partially cut away view of a reactor in accordance with a preferred embodiment of the present invention.

FIG. 2 shows a portion of a reactor 56 corresponding to that shown in FIG. 1. Reactor 56, however, incorporates the present invention. Reactor 56 has a plenum 58 and a shield 60. As with reactor 10 of FIG. 1, reactor 56 has penetrations 62 for its fuel elements 64. Penetrations 62 also have a slotted tube 70 with slots 72. However, each fuel element 64 is not surrounded with a universal sleeve housing as in reactor 10 of FIG. 1. Reactor 56 has a set of housings, generally similar to universal sleeve housing 28, but each different with respect to each other. FIG. 2 shows three housings 74, 76, 78, with housing 74 located toward the center of the reactor core, housing 76 located farther from the core center and housing 78 located near the core periphery. Housings 74, 76, 78 have holes 84 that allow coolant from plenum 58 to flow into the interiors 86, 88, 90, of housings 74, 76, 78, respectively, through slots 72 of slotted tube 70. Each housing 74, 76, 78, will have an upper portion 80 and a lower portion 82. Upper portion 80 is defined by plenum 58; that is, lower portion 82 is the part of housings 74, 76, 78 below plenum 58.

Although holes 84 are shown in FIG. 2 to be of the same diameter and arranged in rows and columns, it is not necessary that the holes be of the same size or so arranged, although it is preferable to do so. It is important, however, to vary (and to control) the amount of coolant admitted to interiors 86, 88, 90, admitting more coolant to those interiors of penetrations near the center of the core and less to those near the periphery of the core. The amount may be varied by changing the total area of the holes of the housings through which coolant flows by varying the diameter of holes 84, by changing the number of holes 84, or, in fact, by changing the shape of the holes, to slots or ovals for example. The amount of coolant flowing to fuel elements 64 should be greatest toward the center of the reactor core and less farther out, least to the peripheral fuel elements 64. Although three housings (74, 76, 78) are shown in FIG. 2, a reactor core can be divided into an arbitrary number of zones (housings 74, 76, 78 representing three different zones) in the form of rings from the center of the core outward, with the amount of coolant entering the interior of the housings of fuel elements in each zone being equal and each outwardly laying zone receiving less coolant than those located in the immediately adjacent, inward zone.

There are two design parameters that affect the amount of flow of coolant into fuel elements 64: the flow area of holes 84 and the elevation of that area relative to the coolant level in plenum 58. Therefore, in addition to holes 84 being all the same diameter and arranged in rows and columns, all housings 74, 76, 78 will preferably have rows beginning at the bottom of upper portion 80 and continuing up toward the top of upper portion 80. The number of rows of holes 84 will then be fewest in housing 78 and greatest for housing 74.

There are no orifice plates in reactor 56. Although orifice plates also serve to restrict flow as does a reduction in the number of holes 84, the impact on the flow of fewer rows of holes in housings 76 and 78 than in 74 results in greater coolant flow to housings 74 under accident conditions. In reactor 56, the peripheral fuel elements 64 receive less coolant during normal operation than the interior fuel elements 64.

Figure 3:
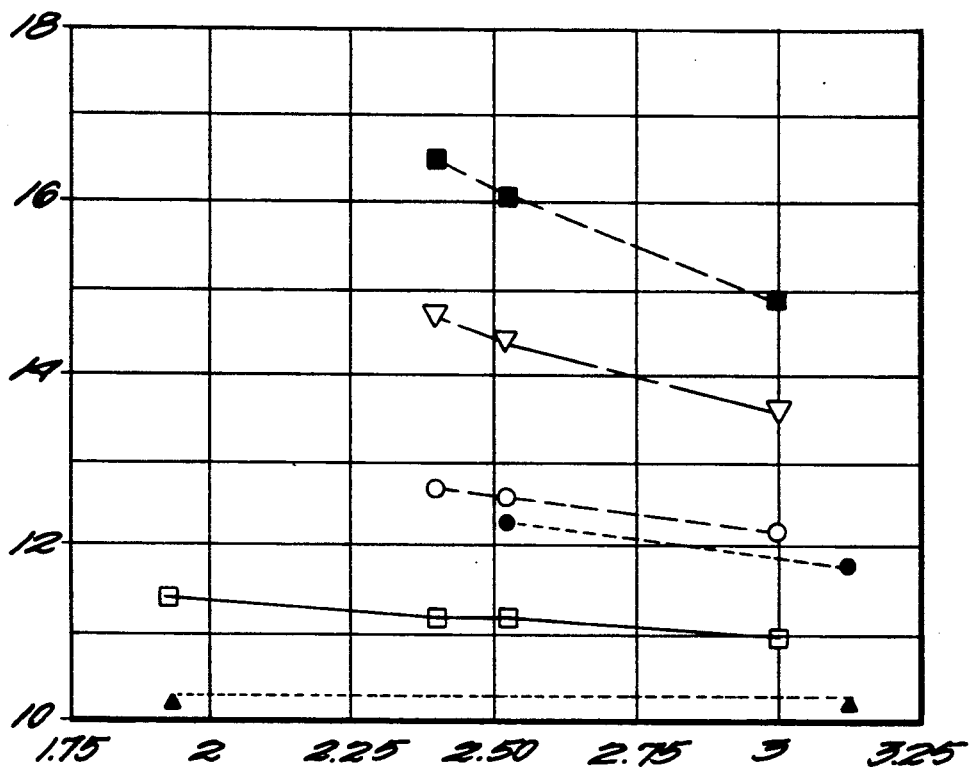
FIG. 3 is a graph of flow to a sleeve during a LOCA versus the height of the rows of holes from the bottom of the upper portion of the sleeve for various numbers of rows.
Figure 4:
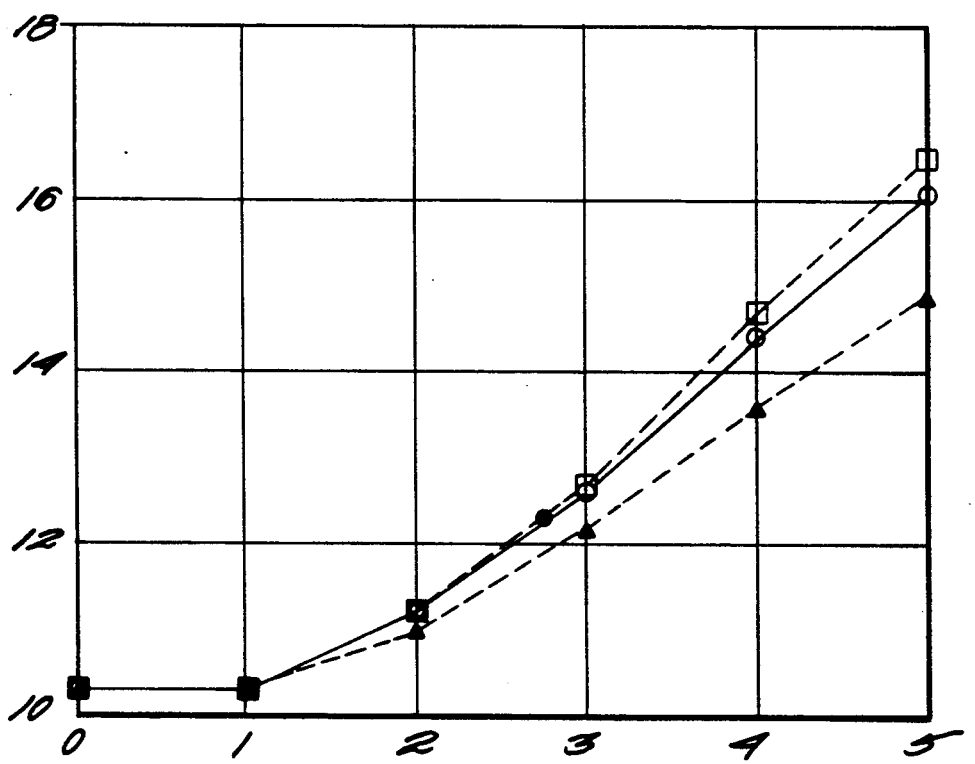
FIG. 4 is a graph of flow to a sleeve during a LOCA versus the number of rings for several different row heights above the bottom of the upper portion of the plenum.

FIGS. 3 and 4 illustrate the effect on flow to fuel elements 64 graphically. FIG. 3 is in particular a graph of several series of data points, each series corresponding to a number of zones. The graph shows the minimum flow of coolant to fuel elements during a LOCA versus the height of holes 84 beginning with a row on the bottom of upper portion 80. If the top rows of holes in the outermost zones are eliminated, the minimum flow of coolant increases. If the number of rows eliminated is five from the housings in the outer three zones of a particular reactor, minimum flow increases from 10.3 to 12.6 gallons per minute, a 22% increase. Greater increases are seen as more zones are revised to have five fewer rows. For five zones, the increase is 56% more coolant.

In FIG. 4 the minimum coolant flow is graphed versus the number of zones having fewer holes. The different curves illustrate the change in flow versus the number of affected zones when different numbers of rows are eliminated. It will be seen that the larger the number of rows eliminated and the more zones that are affected, the greater will be the increase in the minimum flow of coolant during a LOCA. At some point, however, normal operation becomes affected by restricted flow. The precise number of holes or flow area in each zone depends on a great many reactor parameters including the power rating of the reactor, its coolant flow rate, its power density, average burnup of the fuel, accident assumptions, other measures taken to mitigate a LOCA, and so forth. However, restriction of flow to the peripheral assemblies by reduction of the flow area to the interiors of the fuel elements housings and lowering the elevation of the flow area relative to the plenum liquid level will generally result in a significant improvement in the flow of coolant to the core during LOCA without reducing flow during nominal conditions.

It will be apparent to those skilled in the art that many changes and substitutions can be made to the preferred embodiment herein described without departing from the spirit and scope of the present invention which is defined by the appended claims.

What is claimed is:

1. In a nuclear reactor having fuel in the form of a core and a plenum above said core, said core having a center and a periphery, said plenum receiving coolant, apparatus comprising:
   a plurality of hollow sleeves for housing said fuel, said sleeves having an upper portion and a lower portion, said upper portion in said plenum, said lower portion below said plenum, said fuel positioned in said lower portion, said sleeves having holes formed in said upper portion to admit said coolant to the interior of said sleeves, said holes admitting varying amounts of coolant from sleeve to sleeve, said amount being greater in sleeves located toward said center of said core than toward said periphery of said core.

2. The apparatus as recited in claim 1, wherein said holes have the same diameter and the number of holes in sleeves located toward said center of said core is greater than the number of holes located toward said periphery of said core.

3. The apparatus as recited in claim 1, wherein said holes are arranged in rows and the number of said rows is varied from sleeve to sleeve, said number of rows being greater in sleeves toward said center of said core than toward said periphery of said core so that the amount of coolant entering the interior of said sleeves toward said center of said core is greater than the amount of water entering the interior of said sleeves toward said periphery of said core.

4. The apparatus as recited in claim 1, wherein said holes are of equal diameter and arranged in rows and the number of said rows is varied from sleeve to sleeve, said number of rows being greater in sleeves toward said center of said core than toward said periphery of said core so that the amount of coolant entering the interior of said sleeves toward said center of said core is greater than the amount of coolant entering the interior of said sleeves toward said periphery of said core.

5. The apparatus as recited in claim 1, wherein said upper portion has a top and a bottom and said holes are arranged in rows beginning at said bottom of said upper portion, whereby said sleeves near said center of said core have more rows, said rows extending more toward said top from said bottom of said upper portion than sleeves located near said periphery of said core.

6. The apparatus as recited in claim 1, wherein said upper portion has a top and a bottom and said holes are of equal diameter and are arranged in rows beginning at said bottom of said upper portion, whereby said sleeves near said center of said core have more rows of holes, said rows extending more toward said top from said bottom of said upper portion than sleeves located near said periphery of said core.

7. In a nuclear reactor having a plurality of hollow sleeves forming a core, said core having a center and a periphery, said sleeves having an upper portion and a lower portion, and a plenum disposed about said upper portion of said sleeves, said plenum receiving coolant, a method for cooling said core comprising the steps of:
   boring at least two different sets of holes in said upper portion of said sleeves, said different sets capable of admitting different amounts of coolant therethrough;
   distributing said sleeves about said core so that said sleeves capable of admitting the highest amount of coolant are placed toward said center of said core and those capable of admitting the least amount of coolant are placed toward said periphery of said core.

8. The method as recited in claim 7, wherein said holes have the same diameter and said at least two different sets each has a different number of holes.

9. The method as recited in claim 7, wherein said upper portion has a top and a bottom and said holes are bored in rows beginning at said bottom, and each set of said at least two sets has a different number of rows of holes.

10. The method as recited in claim 7, wherein said holes have the same diameter, said upper portion has a top and a bottom and said holes are bored in rows beginning at said bottom, and each set of said at least two sets has a different number of rows of holes.

* * * * *